(12) United States Patent
Lin

(10) Patent No.: US 12,284,139 B2
(45) Date of Patent: *Apr. 22, 2025

(54) DUPLEX BLUETOOTH TRANSMISSION TIRE PRESSURE SYSTEM

(71) Applicant: Shih-Yao Lin, Taipei (TW)

(72) Inventor: Shih-Yao Lin, Taipei (TW)

(73) Assignee: SYSGRATION LTD.

( * ) Notice: Subject to any disclaimer, the term of this patent is extended or adjusted under 35 U.S.C. 154(b) by 382 days.

This patent is subject to a terminal disclaimer.

(21) Appl. No.: 17/874,307

(22) Filed: Jul. 27, 2022

(65) Prior Publication Data

US 2023/0041704 A1     Feb. 9, 2023

(30) Foreign Application Priority Data

Aug. 4, 2021    (TW) .................................. 110128739

(51) Int. Cl.
    *H04B 7/00*       (2006.01)
    *B60C 23/04*      (2006.01)
    *H04L 5/14*       (2006.01)
    *H04B 1/3822*     (2015.01)

(52) U.S. Cl.
CPC ............ *H04L 5/14* (2013.01); *B60C 23/0438* (2013.01); *H04B 1/3822* (2013.01)

(58) Field of Classification Search
CPC .............. B60C 23/0481; B60C 23/041; B60C 23/0459; B60C 23/0442; B60C 23/0489; B60C 23/0416; B60C 23/0461; B60C 23/0438; B60C 23/0452; H01Q 1/2241; H01Q 1/2291; H04W 4/80; H04W 4/38; H04W 4/40; B60Y 2400/302; B60Y 2400/306; B60Y 2400/3086
See application file for complete search history.

(56) References Cited

U.S. PATENT DOCUMENTS

| | | | | |
|---|---|---|---|---|
| 5,744,874 | A * | 4/1998 | Yoshida | G07C 9/00182 340/426.36 |
| 6,323,566 | B1 * | 11/2001 | Meier | G07C 9/00309 340/426.36 |
| 6,362,731 | B1 * | 3/2002 | Lill | B60C 23/0483 340/447 |
| 6,414,586 | B1 * | 7/2002 | Yoshizawa | G07C 9/00182 340/5.2 |
| 6,445,287 | B1 * | 9/2002 | Schofield | B60C 23/00 340/447 |
| 10,220,660 | B2 * | 3/2019 | McIntyre | B60C 23/0471 |
| 10,913,315 | B1 * | 2/2021 | Del Olmo | B60C 23/00354 |
| 11,090,987 | B1 * | 8/2021 | Hampton | B60C 23/004 |

(Continued)

*Primary Examiner* — Stephen M D Agosta

(57) ABSTRACT

A duplex Bluetooth transmission tire pressure system is provided. The duplex Bluetooth transmission tire pressure system includes a host, a plural of Bluetooth tire pressure detectors and a plural of vehicle transceivers; the host is electrically connected to the plural of vehicle transceivers; the plural of vehicle transceivers and the plural of Bluetooth tire pressure detectors are Bluetooth duplex packet transmitted. The plural of Bluetooth tire pressure detectors includes a locating program and a tire condition program. The host commands the vehicle transceiver to transmit a Bluetooth controlling packet to the plural of Bluetooth tire pressure detectors to operate or stop the locating program and limit the tire condition program.

4 Claims, 7 Drawing Sheets

(56) References Cited

U.S. PATENT DOCUMENTS

| | | | | |
|---|---|---|---|---|
| 2002/0003571 | A1* | 1/2002 | Schofield | B60R 1/04 348/148 |
| 2004/0113765 | A1* | 6/2004 | Suitsu | B60C 23/0442 340/445 |
| 2004/0160352 | A1* | 8/2004 | Shimizu | G07C 9/00944 340/13.24 |
| 2006/0209536 | A1* | 9/2006 | Bartels | G09F 21/045 362/192 |
| 2007/0096938 | A1* | 5/2007 | Lopez | G08C 17/02 455/521 |
| 2011/0254678 | A1* | 10/2011 | Sun | B60C 23/0438 340/447 |
| 2014/0116592 | A1* | 5/2014 | Bushnell | B60C 23/135 152/210 |
| 2015/0239307 | A1* | 8/2015 | Horikoshi | B60C 23/0477 340/442 |
| 2016/0082975 | A1* | 3/2016 | Lovett | B60W 10/30 701/2 |
| 2016/0129736 | A1* | 5/2016 | Peine | G01B 7/30 701/32.3 |
| 2016/0159274 | A1* | 6/2016 | Salter | G01M 17/027 315/77 |
| 2017/0234745 | A1* | 8/2017 | Choi | G01L 9/0052 73/146.3 |
| 2017/0274712 | A1* | 9/2017 | Salter | F21K 9/64 |
| 2017/0274952 | A1* | 9/2017 | Cheng | B62J 3/10 |
| 2018/0109622 | A1* | 4/2018 | Galula | H04W 84/005 |
| 2018/0236825 | A1* | 8/2018 | Hinz | B60C 23/00354 |
| 2018/0244281 | A1* | 8/2018 | Jankowski | B60W 10/18 |
| 2019/0070909 | A1* | 3/2019 | Liu | B60C 23/0471 |
| 2019/0193491 | A1* | 6/2019 | Cheng | B60C 29/005 |
| 2019/0260800 | A1* | 8/2019 | Shalev | H04L 63/0428 |
| 2019/0349875 | A1* | 11/2019 | Wu | H04W 56/003 |
| 2021/0067195 | A1* | 3/2021 | Yu | H04B 1/715 |
| 2021/0178839 | A1* | 6/2021 | Deniau | B60C 23/0479 |
| 2021/0407226 | A1* | 12/2021 | Zhang | G06Q 10/20 |
| 2022/0032940 | A1* | 2/2022 | Jankowski | B60C 23/009 |

* cited by examiner

DUPLEX BLUETOOTH TRANSMISSION TIRE PRESSURE SYSTEM

CROSS-REFERENCE TO RELATED PATENT APPLICATION

This application claims the benefit of priority to Taiwan Patent Application No. 110128739, filed on 4 Aug. 2021. The entire content of the above identified application is incorporated herein by reference.

FIELD OF THE DISCLOSURE

The present disclosure relates to a tire pressure detecting and keyless system, and more particularly to a receiving host can duplex transmit Bluetooth signals for tire locating, tire condition detection and door unlocking.

BACKGROUND OF THE DISCLOSURE

The automatic positioning technology of the tire pressure detector means that the transceiver host in the car can receive the signal and automatically determine the position of the tire pressure detector through the tire speed, rotation phase angle, or signal strength. Some tire pressure detectors configured by car manufacturers can automatically locate each time the vehicle is stopped. However, some tire pressure detectors must be removed from the tire and replaced with a new product or be calibrated when the tire pressure detector is out of action due to insufficient power, or during routine maintenance such as tire rotation for average wear, or tire replacement. Once the locating between the tire pressure detector and the transceiver host is completed, the tire pressure detector simplex transmits the temperature and pressure to the transceiver host, so that the transceiver host can obtain the tire condition.

The conventional automatic locating technology of the tire pressure detector is one-way data transmission from the tire pressure detector (as shown in FIG. 7). Generally, the tire pressure detector transmits the locating data would cost about 10 minutes. The positioning calculation of the tire pressure detector is very power-consuming, and has the following effects:
1. Even if the transceiver host has complete locating with the tire pressure detector, the tire pressure detector will continue to transmit the locating data to the transceiver host.
2. After the tire pressure detector and the transceiver host complete the locating, every time the vehicle stops temporarily for more than 10 minutes and restarts, the tire pressure detector will transmit the locating data again, thus wasting time in transmitting the locating data.
3. Due to the general tire pressure detector transmitting the locating data for 10 minutes at a fixed time, the transceiver host cannot receive continuous valid data when there is an error or interruption in the locating data received by the transceiver host. As a result, the tire pressure detector can re-transmit the locating data again only when the vehicle is stopped and turned off for restart.

SUMMARY OF THE DISCLOSURE

The present disclosure provides a duplex Bluetooth transmission tire pressure system, in which a host and a Bluetooth tire pressure detector provide a Bluetooth duplex packet transmission to complete locating and tire condition detection, as well as to overcome the problems of conventional technology.

In one aspect, to achieve the objective and effort mentioned above, the present disclosure provides a duplex Bluetooth transmission tire pressure system, comprising a host, a plural of Bluetooth tire pressure detectors and a plural of vehicle transceivers; wherein the host is electrically connected to the plural of vehicle transceivers; wherein the plural of vehicle transceivers and the plural of Bluetooth tire pressure detectors are Bluetooth duplex packet transmitted. Each of the plural of Bluetooth tire pressure detectors includes a locating program and a tire condition program. The host commands the vehicle transceiver to transmit a Bluetooth controlling packet to the plural of Bluetooth tire pressure detectors to operate or stop the locating program and limit the tire condition program.

BRIEF DESCRIPTION OF THE DRAWINGS

The described embodiments may be better understood by reference to the following description and the accompanying drawings in which.

DETAILED DESCRIPTION OF THE EXEMPLARY EMBODIMENTS

Figure 1:
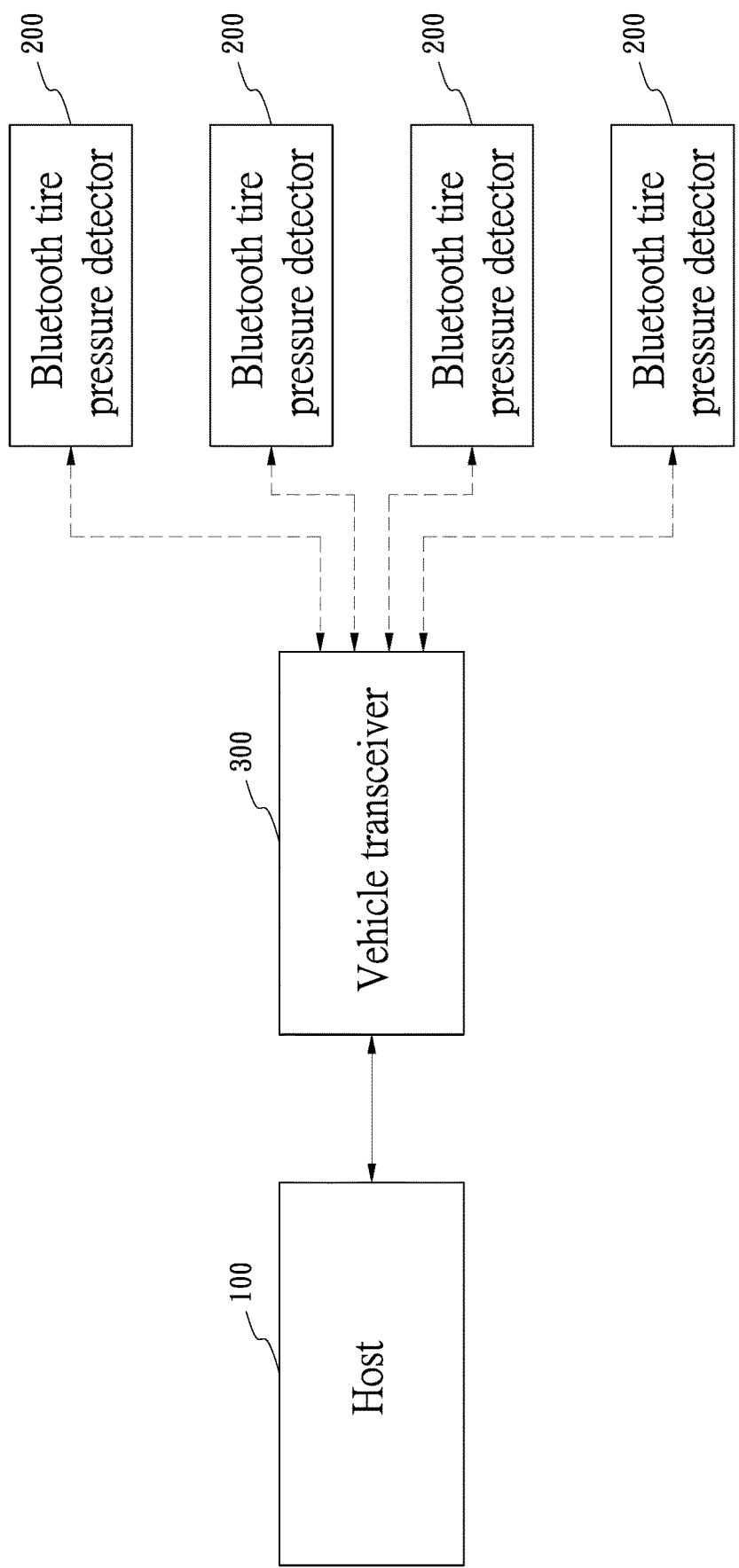
FIG. 1 is a block schematic diagram of the duplex Bluetooth transmission tire pressure system of the present disclosure.

Referring to FIG. 1, which is a duplex Bluetooth transmission tire pressure system, comprising a host 100, a plural of Bluetooth tire pressure detectors 200 and a plural of vehicle transceivers 300; in which, the host 100 is electrically connected to the plural of vehicle transceivers 300, the plural of vehicle transceivers 300 and the plural of Bluetooth tire pressure detectors 200 are Bluetooth duplex packet transmitted; each of the plural of Bluetooth tire pressure detectors 200 includes a locating program 231 and a tire condition program 232; the host 100 commands the vehicle transceiver 300 to transmit a Bluetooth controlling packet to the plural of Bluetooth tire pressure detectors 200 to operate or stop the locating program 231 and limit the tire condition program 232.

The host 100 mentioned above has a host processing unit. For example, the host 100 is located inside the vehicle, the Bluetooth tire pressure detector 200 is mounted on the tire of the vehicle (which can be either an inner side or an outer side). Each of the plural of vehicle transceivers 300 includes a vehicle transceiver antenna 310 and a vehicle transceiver unit 320. The vehicle transceiver 300 is mounted on the exterior rear-view mirror, interior rear view mirror, door, trunk lid, door handle, etc. of the vehicle.

Figure 2:
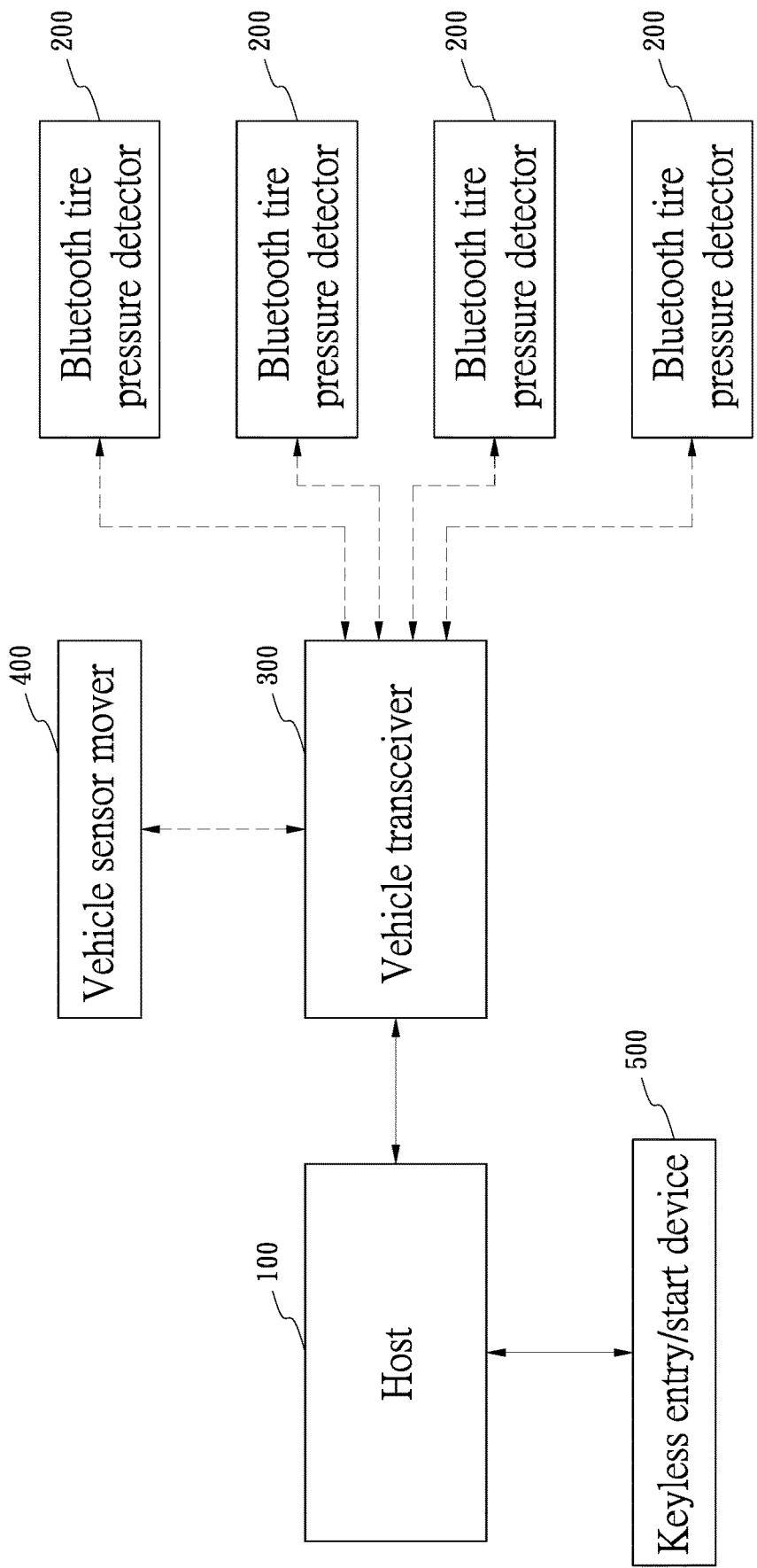
FIG. 2 is another block schematic diagram of the duplex Bluetooth transmission tire pressure system of the present disclosure.
Figure 3:
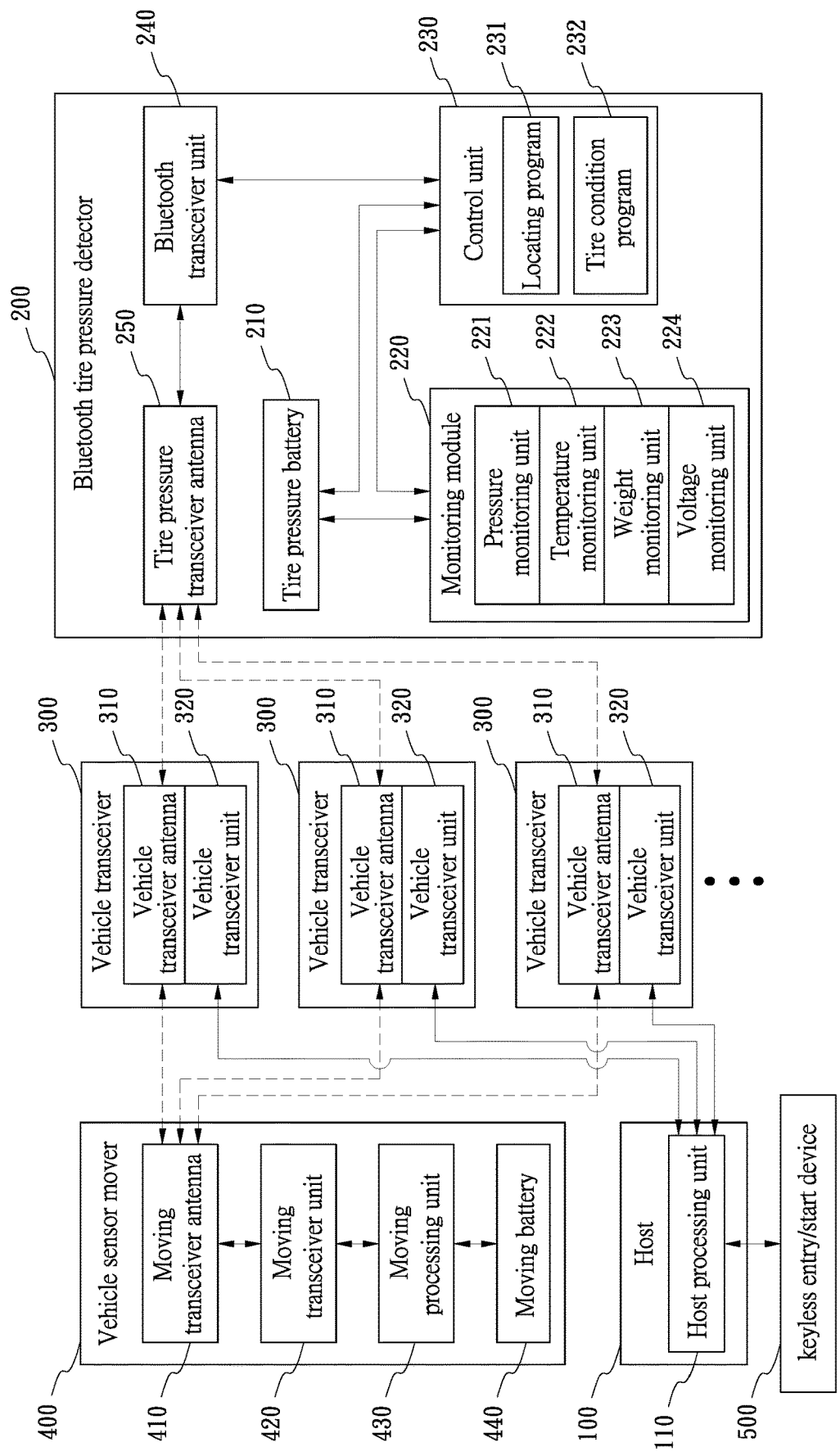
FIG. 3 is a block schematic diagram of operating the full-duplex Bluetooth transmission tire pressure system of the present disclosure.

The duplex Bluetooth transmission tire pressure system of the present disclosure further includes a vehicle sensor mover 400 and a keyless entry/start device 500, as shown in FIGS. 2 and 3. The keyless entry/start device is electrically connected to the host 100, and the vehicle sensor mover 400 and the plural of vehicle transceivers 300 are Bluetooth duplex packet transmitted. The vehicle sensor mover 400 transmits the Bluetooth identifying packet to the host 100 through the plural of vehicle transceivers 300, and the identifying data is confirmed by the host 100 to be consistent to operate the keyless entry/start device 500. The vehicle sensor mover 400 includes a moving transceiver antenna 410, a moving transceiver unit 420, a moving processing unit 430 and a moving battery 440, in which the moving battery 440 is electrically connected to the moving processing unit 430, and the moving transceiver unit 420 is electrically connected to the moving transceiver antenna 410 and the moving processing unit 430.

Figure 4:
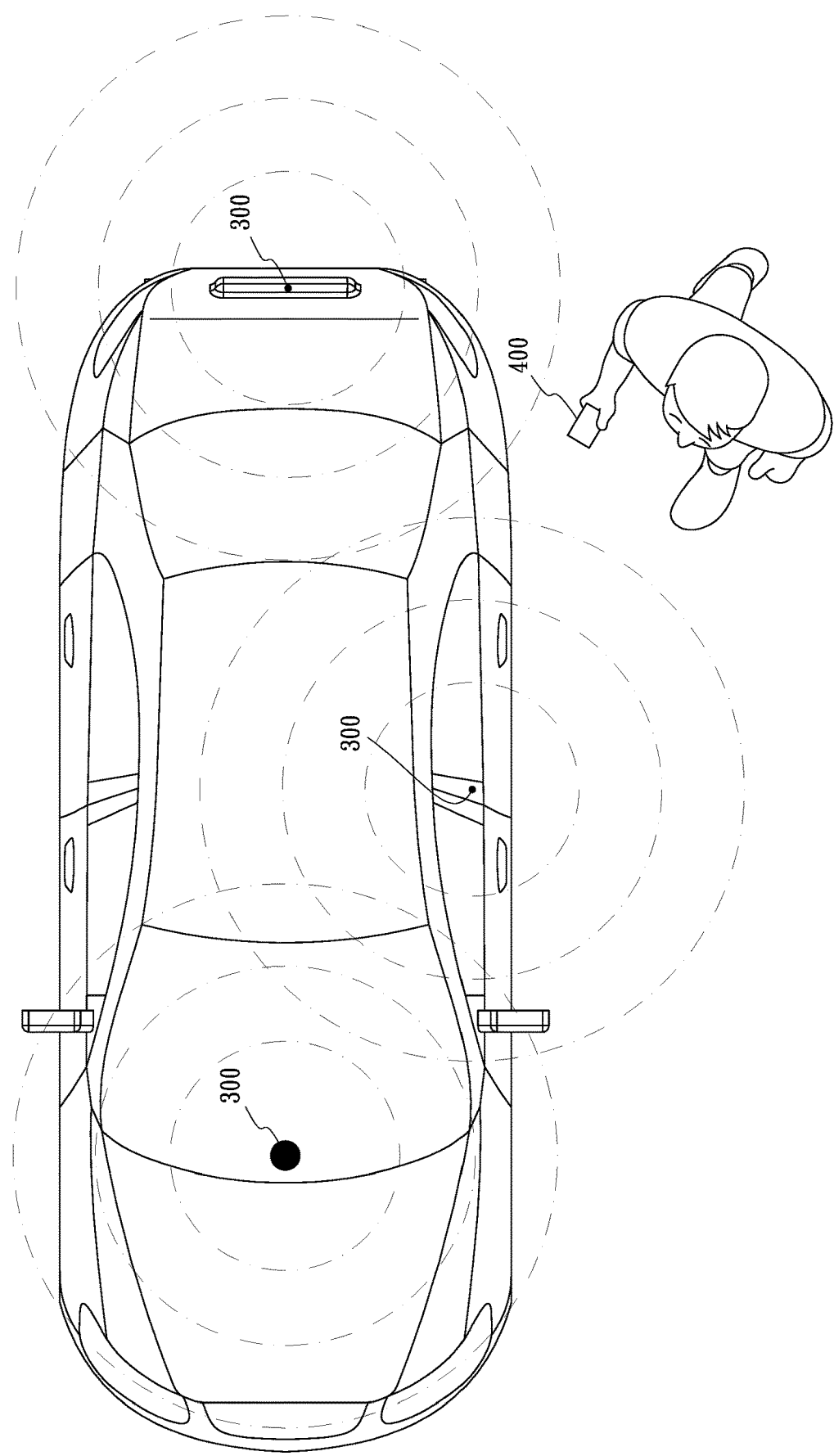
FIG. 4 is a schematic view of the vehicle sensor mover that does not enter the sensing range of the vehicle transceiver.
Figure 5:
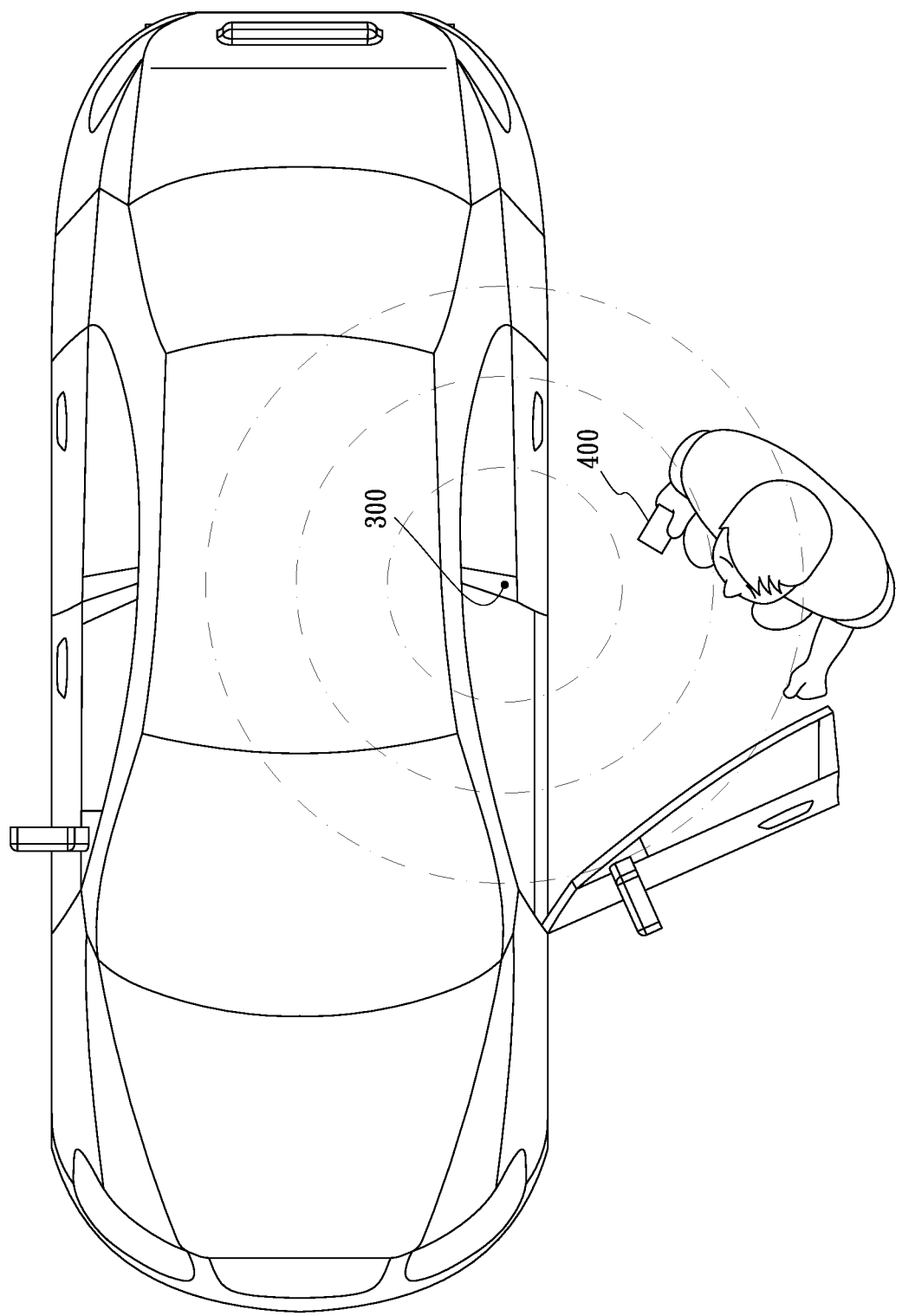
FIG. 5 is a schematic view of the vehicle sensor mover enters into the sensing range of the vehicle transceiver.

In conjunction with FIGS. 3-5, the user with the vehicle sensor mover 400 (a mobile device is used as an example) moves into the sensing range from the outside of the sensing range, the vehicle sensor mover 400 transmits a Bluetooth identifying packet through the moving transceiver antenna 410 of the moving transceiver unit 420 to the host 100, and the data is confirmed by the data saved in the host 100, the host processing unit 110 commands the keyless entry/start device 500 to unlock and open the door, and enable the user to start the vehicle at any time.

Referring to FIG. 3, each of the plural of Bluetooth tire pressure detectors 200 includes a tire pressure battery 210, a monitoring module 220, a control unit 230, a Bluetooth transceiver unit 240 and a tire pressure transceiver antenna 250; wherein the tire pressure battery 210 is electrically connected to the control unit 230 and the monitoring module 220, the control unit 230 is electrically connected to the monitoring module 220, and the Bluetooth transceiver unit 240 is electrically connected to the control unit 230 and the tire pressure transceiver antenna 250; wherein the control unit 230 includes a locating program 231 and a tire condition program 232, and the data detected by the monitoring module 220 is obtained by the locating program 231 and the tire condition program 232.

Further, the monitoring module 220 includes a pressure monitoring unit 221, a temperature monitoring unit 222, a gravity monitoring unit 223 and a voltage monitoring unit 224 224. Through the pressure monitoring unit 221, the temperature monitoring unit 222, and the gravity monitoring unit 223, information for assisting in locating can be detected such as tire pressure, temperature, acceleration, rotation time, rotation phase, tire position, etc. In addition, the voltage of the tire pressure battery 210 can be detected through the voltage monitoring unit 224, so as to prevent the voltage of the tire pressure battery 210 from being lower than the operating voltage of the monitoring module 220 and the control unit 230, and prevent abnormality or insufficient power in the tire pressure battery 210.

The host 100 transmits a Bluetooth controlling packet through the vehicle transceiver 300 to the Bluetooth tire pressure detector 200 for operating the tire condition program 232, and limits transmitting the data of the monitoring module 220 through the control unit 230. The control unit 230 resumes the Bluetooth tire pressure detector 200 for transmitting the Bluetooth tire state package to the host 100 through the vehicle transceiver 300 when the data from the monitoring module 220 compared to the default value of tire condition program 232 shows an abnormal state.

Figure 6:
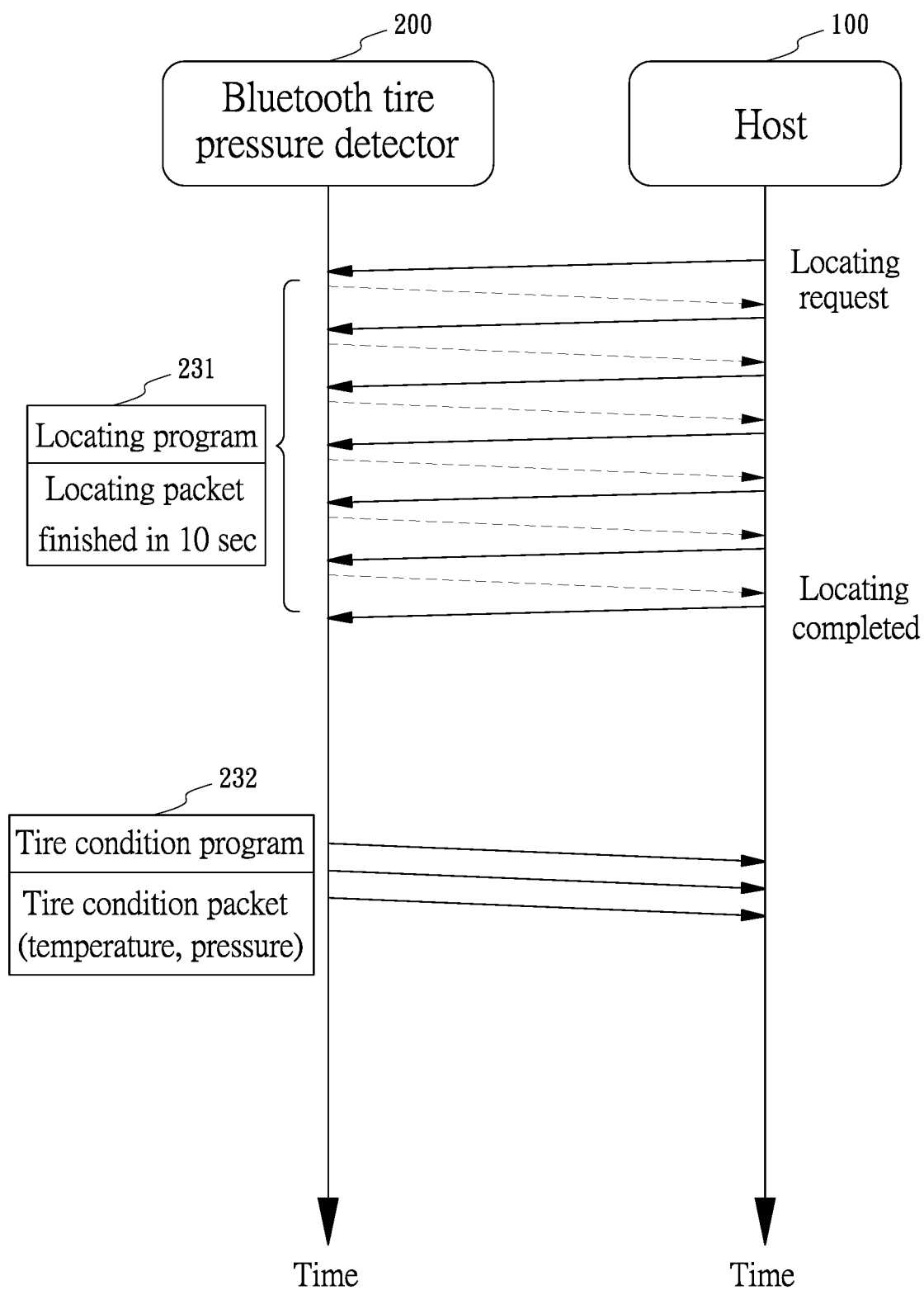
FIG. 6 is a schematic view of the duplex signal transmission between the Bluetooth tire pressure detector and the vehicle transceiver of the present disclosure.
Figure 7:
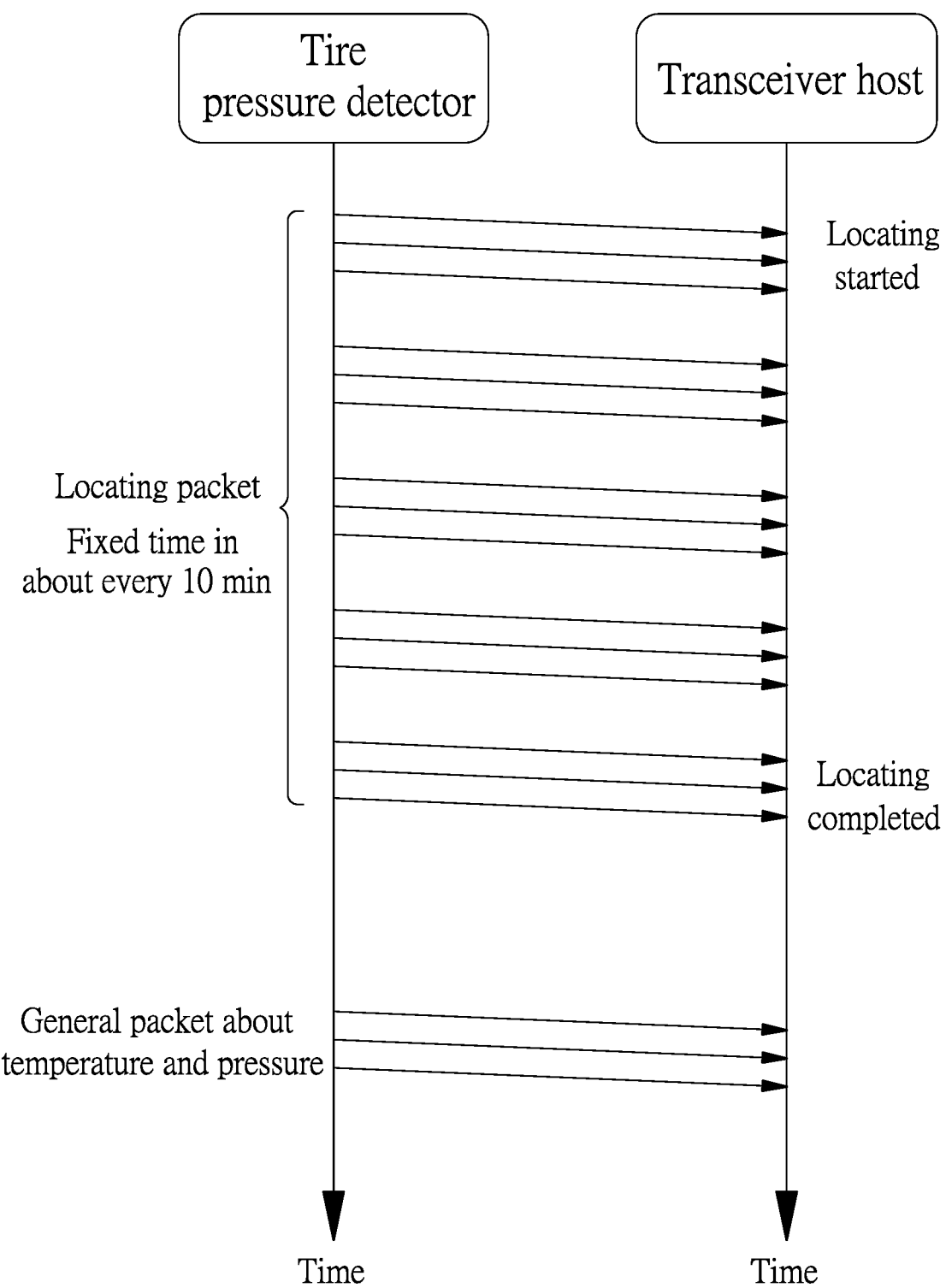
FIG. 7 is a schematic view of the conventional tire pressure detector simplex transmitting the signal to the transceiver host.

It is worth mentioning that, in one embodiment, the host 100 commands the control unit 230 of the Bluetooth tire pressure detector 200 through the vehicle transceiver 300 to operate the locating program 231 and the condition program 232 simultaneously. The order of the processes is as shown in FIG. 6. In another embodiment, the locating program 231 of the control unit 230 operates first, and then to operate the tire condition program 232 after the operation of the locating program 232 is finished.

The above-mentioned Bluetooth tire pressure detector 200 transmitting the Bluetooth locating packet to the host 100 is completed within 10 seconds from the beginning to the end, and the locating program 231 is turned off. The above-mentioned transmitting the Bluetooth tire condition packet to the host 100 is completed within 3 seconds from the beginning to the end, and contentious the tire condition program 232.

The Bluetooth tire pressure system and the method of the present disclosure can duplex transmit the packets. According to the needs, the host 100 commands the Bluetooth tire pressure detector 200 through the vehicle transceiver 300 to operate the tire condition program 231, during this time, the Bluetooth tire pressure detector 200 transmits the Bluetooth locating packet to the host 100 through the vehicle transceiver 300 continuously. When the host 100 completes the locating of the Bluetooth tire pressure detector 200, the host 100 transmits a Bluetooth control packet through the vehicle transceiver 300 to control the Bluetooth tire pressure detector 200 turning the locating program 231 off and operating the tire condition program 232. Or according to the needs, the host 100 commands the Bluetooth tire pressure detector 200 through the vehicle transceiver 300 to operate the tire condition program 231 and the tire condition program 232 simultaneously, during this time, the Bluetooth tire pressure detector 200 transmits the Bluetooth locating packet and the Bluetooth tire condition packet through the vehicle transceiver 300 to the host 100 continuously. When the transceiver host 100 completes the locating of the Bluetooth tire pressure detector 200, the host 100 transmits a Bluetooth control packet through the vehicle transceiver 300 to command the Bluetooth tire pressure detector 200 turning the locating program 231 off and keeping operating the tire condition program 232.

Therefore, the duplex Bluetooth transmission tire pressure system of the present disclosure has the following advantages:

1. The host 100 can simultaneously check the data when the Bluetooth locating packet data is received by the vehicle transceiver 300, so as to ensure whether the Bluetooth locating packet is valid (no errors or interruptions), thus the locating between the Bluetooth tire pressure detector 200 and the host 100 through the vehicle transceiver 300 can be completed in a short time.
2. The Bluetooth tire pressure detector 200 can be controlled by the host 100 through the vehicle transceiver 300 to operate the locating program 231 and the tire condition program 232, and after obtaining the locating data of the Bluetooth tire pressure detector 200, the host 100 transmits a Bluetooth control packet to the Bluetooth tire pressure detector 200 for continuously operating the tire condition program 232. The Bluetooth tire pressure detector 200 only operates and is controlled by the host 100 when there is a locating requirement, so that the Bluetooth tire pressure detector 200 will not operate the locating program 231 automatically even when the vehicle temporarily stops and starts again.
3. Errors in the locating data of the tire pressure detector can be prevented. In the conventional art, the vehicle must be stopped for a period of time before the tire pressure detector re-transmits the locating data to the transceiver host. At the same time, the present disclosure can transmit the locating data again in a short time.
4. Through the above-mentioned operating mechanism, the host 100 can control the timing of the Bluetooth tire pressure detector 200 to operate locating through the vehicle transceiver 300, which saves the time of locating compared with the conventional art, the present disclosure indeed saves the electricity of the Bluetooth tire pressure detector 200 to operate and locate.
5. Through the vehicle transceiver 300, the host 100 can duplex Bluetooth transmit signals with the Bluetooth tire pressure detector 200 and the vehicle sensor mover 400 correspondingly. In addition to improving the problems of conventional technology to complete locating and tire condition detection, it can also unlock the locked door of the vehicle and enter the vehicle to start the vehicle, thus the two independent tire pressure detection and keyless function are integrated. Thereby the present disclosure reduces the number of dedicated receivers for the two systems, and indeed reduces the costs and installation time.

In the above description, the present disclosure provides the vehicle transceiver 300 for use in the Bluetooth tire pressure detector 200 and the vehicle sensor mover 400, and also provides for use in the Bluetooth frequency band for monitoring and controlling other devices of the vehicle.

What is claimed is:
1. A duplex Bluetooth transmission tire pressure system, comprising a host, a plural of Bluetooth tire pressure detectors and a plural of vehicle transceivers;
   wherein the host is electrically connected to the plural of vehicle transceivers;
   wherein the plural of vehicle transceivers and the plural of Bluetooth tire pressure detectors are Bluetooth duplex packet transmitted;
   wherein each of the plural of Bluetooth tire pressure detectors includes a locating program and a tire condition program; wherein the host commands the vehicle transceiver to transmit a Bluetooth controlling packet to the plural of Bluetooth tire pressure detectors to operate or stop the locating program and limit the tire condition program;
   a vehicle sensor mover and a keyless entry/start device;
   wherein the keyless entry/start device is electrically connected to the host; the vehicle sensor mover and the plural of vehicle transceivers are Bluetooth duplex packet transmitted;
   wherein the vehicle sensor mover transmits a Bluetooth identifying packet to the host through the plurality of vehicle transceivers, and the identifying data of the host is confirmed to be consistent to operate the keyless entry/start device;
   wherein the vehicle sensor mover includes a moving transceiver antenna, a moving transceiver unit, a moving processing unit and a moving battery; wherein the moving battery is electrically connected to the moving processing unit, and the moving transceiver unit is electrically connected to the moving transceiver antenna and the moving processing unit;
   wherein the monitoring module includes a pressure monitoring unit, a temperature monitoring unit, a gravity monitoring unit and a voltage monitoring unit, and
   wherein the locating program and the tire condition program operate simultaneously.
2. The duplex Bluetooth transmission tire pressure system according to claim 1, wherein each of the plural of Bluetooth tire pressure detectors includes a tire pressure battery, a monitoring module, a control unit, a Bluetooth transceiver unit and a tire pressure transceiver antenna; wherein the tire pressure battery is electrically connected to the control unit and the monitoring module, the control unit is electrically connected to the monitoring module, and the Bluetooth transceiver unit is electrically connected to the control unit and the tire pressure transceiver antenna; wherein the control unit includes a locating program and a tire condition program, and the data detected by the monitoring module is obtained by the locating program and the tire condition program.
3. The duplex Bluetooth transmission tire pressure system according to claim 1, wherein each of the plural of vehicle transceivers includes a vehicle transceiver antenna and a vehicle transceiver unit.
4. The duplex Bluetooth transmission tire pressure system according to claim 1, wherein the host includes a host processing unit.

* * * * *